Dec. 24, 1929.  W. N. TUCKER  1,741,083
POULTRY FEEDER
Filed Feb. 16, 1929
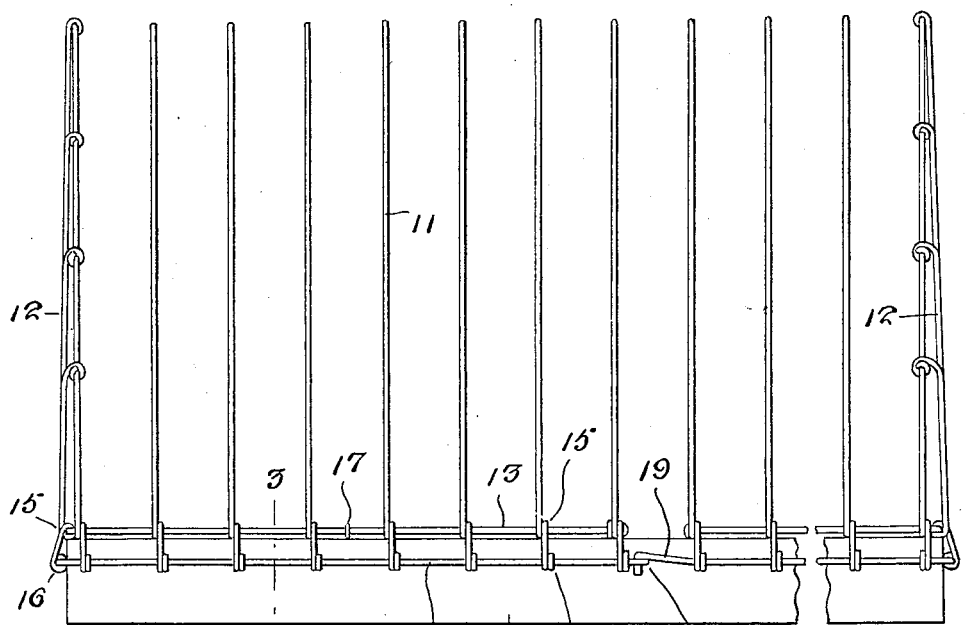
Fig. 1.
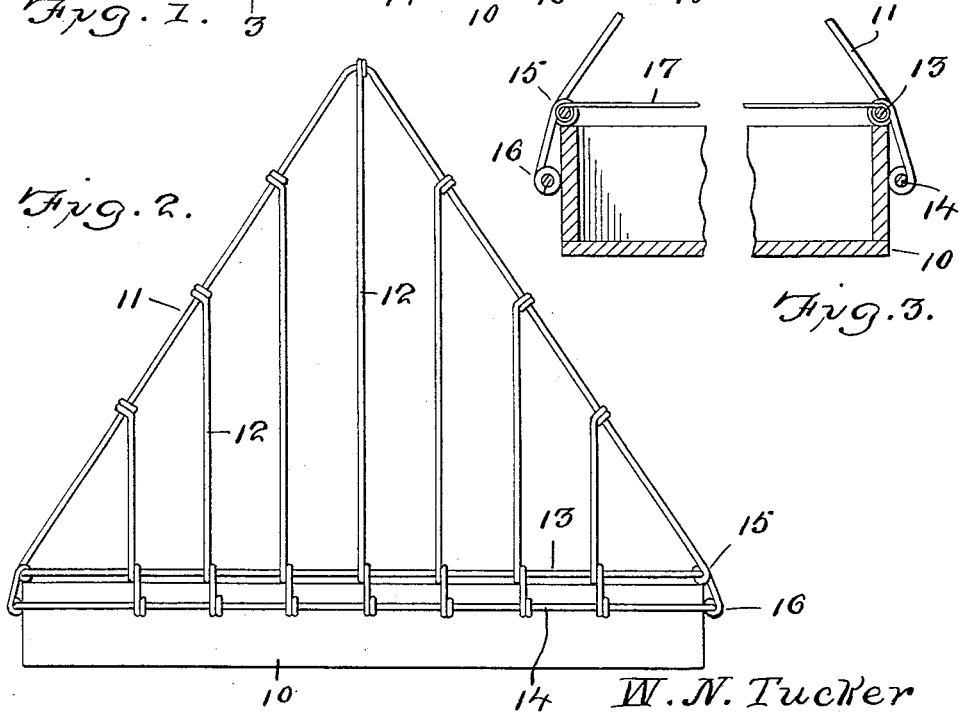
Fig. 2.
Fig. 3.
W. N. Tucker
INVENTOR
BY Victor J. Evans
ATTORNEY Patented Dec. 24, 1929

1,741,083

UNITED STATES PATENT OFFICE

WALTER N. TUCKER, OF MONROE, WASHINGTON

POULTRY FEEDER

Application filed February 16, 1929. Serial No. 340,607.

This invention relates to poultry feeders and has for an object the provision of a feeder in which the feed will be at all times in view of the fowls, but in which the feed will be protected from dirt usually resulting from the fowls entering the trough of the feeder.

Another and important object of the invention is the provision of a feed trough and protector therefor which is simple and inexpensive in construction, and may be readily separated to permit thorough cleaning, so that the feeder may be kept in a sanitary condition.

With the above and other objects in view, the invention further includes the following novel features and details of construction, to be hereinafter more fully described, illustrated in the accompanying drawing and pointed out in the appended claims.

In the drawing:—

Figure 1 is an elevation partly broken away showing a feeder constructed in accordance with the invention.

Figure 2 is an end view thereof.

Figure 3 is an enlarged fragmentary sectional view taken substantially on the line 3—3 of Figure 1.

Referring to the drawing in detail wherein like characters of reference denote corresponding parts, the reference character 10 indicates a trough which may be made of any suitable material and of any desired length and width. This trough is adapted to contain mash or other feed for the fowls.

The protector which is preferably formed of wire comprises upwardly extending side bars 11 which are suitably spaced apart to permit the fowls to obtain food from the trough and prevent said fowls from entering the trough. The spacing bars 11 may be in accordance with the size of the fowls so that troughs or feeders for young chicks will have the bars 11 spaced closer than the bars of the feeder for fully grown fowls.

The bars 11 are upwardly and inwardly inclined as shown in Figure 2 and the end bars have secured thereto the upper ends of spaced vertically disposed bars 12 which form the ends of the protector.

The lower ends of the bars 11 and 12 are connected by vertically spaced upper and lower horizontally disposed bars 13 and 14 which pass through loops or eyes 15 and 16 formed in or carried by the bars 11.

An important feature of the invention resides in making the upper bar 13 of less dimensions than the lower bar 14 so that the eyes 15 through which the bar 14 passes will rest upon the upper edge of the trough 10 as shown in Figures 2 and 3 of the drawings, and the eyes 16 of the lower bar 14 will engage the outside walls of the trough. The protector will thus be securely positioned upon the trough so as to prevent its displacement by the fowls, yet may be readily removed and replaced when it is desired to clean and refill the trough.

The protector may be made of suitable length and in order to increase rigidity, the bars 13 may be connected by transversely disposed tie wires 17. If desired, the protectors may be made in separate sections for use with relatively long troughs and in order to detachably connect these sections, eyes 18 extend from one of the sections while hooks 19 extend from another section. These eyes are preferably provided in the extended ends of the bars 14 of one section and the hooks 19 formed by extensions of the bars 14 of another section as shown in Figure 1 of the drawing.

The invention is susceptible of various changes in its form, proportions and minor details of construction and the right is herein reserved to make such changes as properly fall within the scope of the appended claims.

Having described the invention what is claimed is:—

1. In a poultry feeder, a feed trough including upwardly extending walls, a guard removably mounted upon the trough and comprising spaced upwardly extending bars, spaced upper and lower horizontal bars connecting the upwardly extending bars, eyes carried by the upwardly extending bars to receive and engage the horizontal bars, and the upper horizontal bar being of less dimensions than the lower bar, whereby the eyes for said upper bar will rest upon the upper edge of the walls of the trough with the eyes for the lower bar engaging the sides of said walls.

2. In a poultry feeder, a feed trough, a sectional protector mounted thereon, said protector including spaced upwardly extending bars, horizontal bars connecting said upwardly extending bars, eyes formed in the horizontal bars of one section, and hooks formed on the ends of the horizontal bars of an adjacent section to detachably connect the sections.

In testimony whereof I affix my signature.

WALTER N. TUCKER.